United States Patent Office 2,802,832
Patented Aug. 13, 1957

2,802,832

3-(4-CHLOROPHENOXY)PHTHALIDE

Donald D. Wheeler and David C. Young, Midland, Mich., assignors to The Dow Chemical Company, Midland, Mich., a corporation of Delaware No Drawing. Application April 30, 1956,
Serial No. 581,335

1 Claim. (Cl. 260—343.3)

This invention is directed to 3-(4-chlorophenoxy) phthalide having the structure

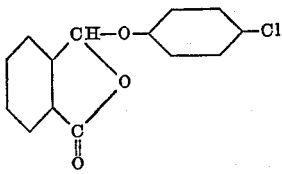

This new compound is a white, crystalline solid somewhat soluble in organic solvents such as benzene and acetone, and substantially insoluble in water. The compound is useful as a fungicide, particularly for the control of soilborne phytopathological fungi.

The compound of this invention is conveniently prepared by causing phthalaldehydic acid to react with 4-chlorophenol. The terms "phthalaldehydic acid" and "3-hydroxyphthalide" refer to a compound having the structure

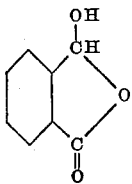

Phthalaldehydic acid is often represented in the literature as having the structure

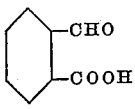

However, the acid employed in this invention and prepared as hereinafter described exists almost entirely in the closed ring, 3-hydroxyphthalide structure, as observed from a study of its infrared absorption spectrum. The infrared spectrum supports the closed ring 3-(4-chlorophenoxy)phthalide structure for the product.

In a method for carrying out the reaction, phthalaldehydic acid and 4-chlorophenol are heated in the temperature range from 90° to 120° C. under reduced pressure for one to four hours. During the heating, a reaction occurs with the formation of the desired 3-(4-chlorophenoxy)phthalide product and water of reaction. Much of the latter is removed by volatilization during the heating process. After completion of the reaction, the crude product is poured into water whereupon the desired phthalide product precipitates as a solid. The latter is recovered by filtration. If desired, the product may be purified by conventional procedures such as by recrystallization.

In a representative preparation, 59.3 grams (0.5 mole) of 4-chlorophenol and 75 grams (0.5 mole) of phthalaldehydic acid were heated to a temperature of 110° C. at 10 millimeters pressure over a period of four hours. At the end of this period the reaction mixture was poured into water to obtain a solid 3(4-chlorophenoxy)phthalide product as a precipitate. The aqueous mixture was filtered to recover the precipitate. The latter was recrystallized from benzene to obtain a purified product melting at 157–158° C.

The novel compound of the present invention is useful in controlling soil-infesting fungi which attach germinating seeds. In a representative operation, inhibition of growth was obtained when rosebengal-streptomycin agar was plated with an aqueous dispersion of 3-(4-chlorophenoxy)-phthalide containing the spores of *Fusarium oxysporum lycopersici*.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid and ferric chloride solution, as more fully disclosed and claimed in the copending application of James D. Head and Owen D. Ivins, Serial Number 279,682, filed March 31, 1952, now Patent No. 2,748,162.

We claim:
3-(4-chlorophenoxy)phthalide.

References Cited in the file of this patent

UNITED STATES PATENTS 2,150,595   Austin et al. _____ Mar. 14, 1939

FOREIGN PATENTS 523,595   Canada _____ Apr. 3, 1956

OTHER REFERENCES

Bistrzycki et al.: Berichte, vol. 27, pp. 2632–40 (1894).